Feb. 3, 1942.          R. S. STARKEY          2,271,808
                    ARTICULATED VEHICLE
                   Filed May 31, 1940          2 Sheets-Sheet 1
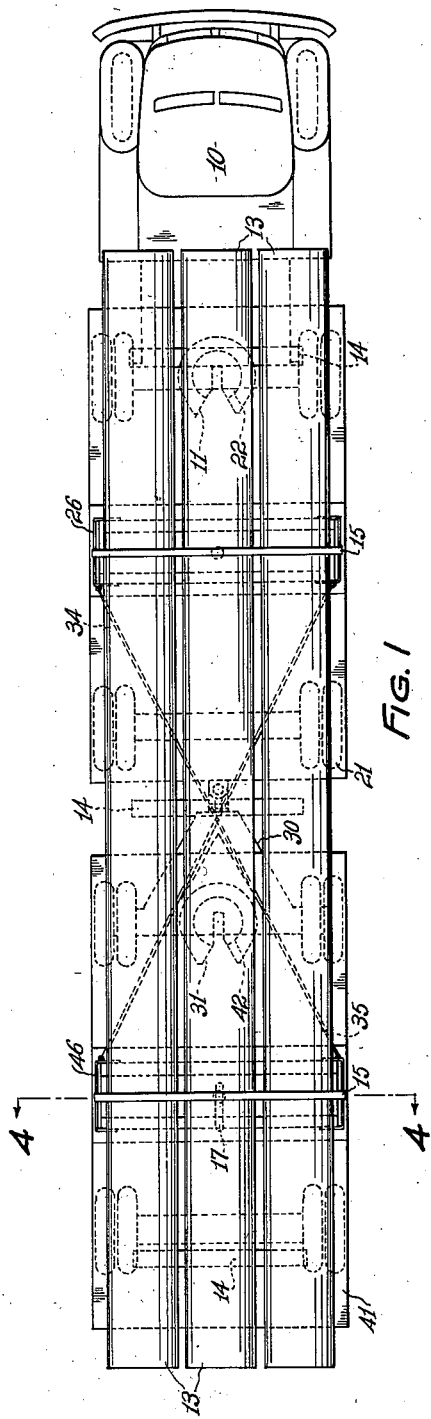
INVENTOR.
Roy S. Starkey
BY
Morton L. Brockman
ATTORNEY.

Feb. 3, 1942. R. S. STARKEY 2,271,808
ARTICULATED VEHICLE
Filed May 31, 1940 2 Sheets-Sheet 2

INVENTOR.
Roy S. Starkey
BY Morton S. Brockman
ATTORNEY.

Patented Feb. 3, 1942

2,271,808

UNITED STATES PATENT OFFICE 2,271,808

ARTICULATED VEHICLE

Roy S. Starkey, Warrensville, Ohio

Application May 31, 1940, Serial No. 338,019

1 Claim. (Cl. 280—33.2)

This invention relates to motor trucks and particularly to heavy trucks designed to transport heavy but frangible pipe of exceptionally large diameters and lengths.

As conducive to a clearer understanding of this invention, it may be well to point out that heretofore large tubular conduits such as water or sewer pipes were transported in sections having lengths of about twenty feet each. Such conduits are made of specially coated steel or concrete and have diameters ranging from approximately six inches to ten feet. As a result of their size and material they are relatively fragile and unless they are handled and carried with utmost care, they are quite easily damaged. The steel pipe especially is easily damaged in transit. A steel water pipe of this type is about three-eighths inch thick and is coated inside and outside with an asphaltic paint. It has a sheet of asbestos paper over the first outer asphaltic coat and then is again covered with a second coat of asphalt. Therefore, if the pipe slides on, rubs or is otherwise affected by the saddles or bolsters on which they sit, the coatings, which are only about three-sixteenths inch thick are damaged and the durability of the pipe is seriously affected.

Because of this frangible characteristic, such pipe could best be handled and transported in the shorter length of about twenty feet. A serious disadvantage, however, was experienced in the handling of the shorter lengths. The shorter lengths require that many more joints or coupling sections be used in their installation than in the installation of the longer sections. These coupling sections are expensive items and require special labor for their installation.

In the past many efforts have been made to transport extra long pipe of this character but without success. Many of the devices were simply modifications of old-time log-haulers and some of them were simple trailer attachments but none of them were capable of making long distance hauls, loaded with frangible pipe having section lengths of from fifty to sixty feet with safety and economy.

It is therefore a primary object of this invention to provide an articulated vehicle which is capable of carrying frangible pipe of extraordinary lengths.

Another object is to construct such device so that the load is not strained, warped or otherwise injuriously affected during transit by highway turns and uneven road surfaces.

A further object is to construct a truck of the type mentioned which may be assembled, steered, controlled and otherwise maneuvered with relative simplicity and which can make relatively sharp turns in spite of the extraordinary length of its load.

These and other objects and features of the invention will become apparent from a study of the following description and claim together with the accompanying drawings in which like parts are designated by like reference characters and wherein:

Figure 1 is a plan view of the articulated vehicle of this invention loaded with extraordinary lengths of conduit;

Figure 2 is a side elevation of the vehicle and load shown in the Figure 1;

Figure 3:
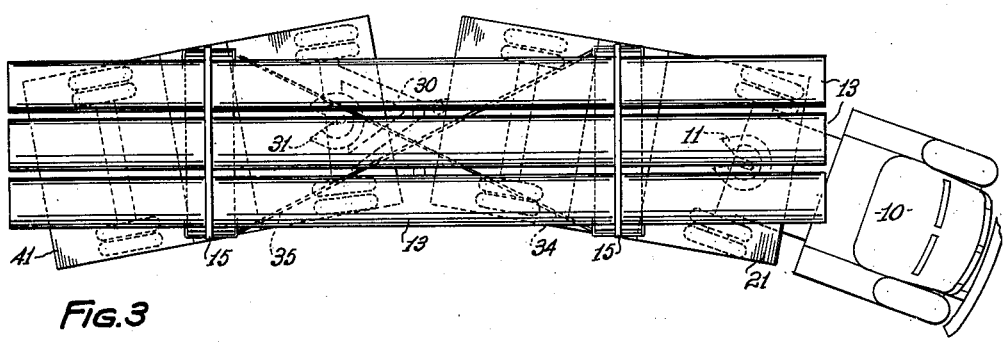
Figure 3 is a plan view of the vehicle of Figure 1 showing the relative positions of its members and load when making a turn.

Referring to the drawings there is shown a heavy duty truck consisting of a tractor 10, a first articulated truck or trailer 20 flexibly connected thereto and a second truck or trailer 40 flexibly connected in tandem fashion to the first trailer. A load of exceptionally long pipe is also shown as being carried by the trailers 20 and 40 in a manner which will be fully set forth hereinafter.

The tractor 10 is of a conventional type having a coupling device or fifth-wheel 11 mounted on the rear part thereof or approximately over its rear carriage 19.

The first rear trailer 20 has a flat horizontal platform 21, the rear part of which is supported by the carriage 29 and the front part of which is provided with a pivot member 22. The pivot member 22 is engageable with the fifth-wheel 11 of the tractor member in a manner familiar to the art.

To the rear end of the first trailer 20 there is attached a dolly or towing member 30 by means of the universal link 32. This towing member 30 is mounted, at its rear end, on the carriage 39 and is also provided with a fifth-wheel 31.

The second trailer 40 is similar to the first and their positions are interchangeable in the train. It also has a platform 41 supported at its rear end by the carriage 49 and has a depending pivot member 42 on its front end which is engageable with the fifth-wheel 31 of the towing member.

Each of the trailers are provided with a saddle-like holder which is referred to herein as a bolster. The first or forward bolster 23 consists of a rectangular base 24 made of heavy durable wood which is about as long as the platform 21 is wide. Each end of the base 24 is provided with a U-shaped metal extension which is also referred to herein as a load-tying bracket 26. The top part 27 of the bolster 23 is channelled laterally so that the pipes constituting the load nest therein without touching each other. The channelled portions are padded so that the asbestos cover and the asphalt coating on the pipes are not damaged. The padding, however, is not shown in the drawings as it may consist of many well known types of materials. Shredded wood covered with paper or cloth is the type of padding most generally used.

A long and rather substantial pin or bolt 28 is used to pivot the bolster 23 to the platform 21. This bolt 28 is fastened to the bolster at its central portion and extends downward through a round hole in the platform 21 in the longitudinal center thereof and at a point midway between the carriages 19 and 29. In order to facilitate the pivoting of the bolster 23 on the platform 21, that portion of the platform which may contact the bolster is provided with a smooth metal plate 25. The plate may be lubricated so that the wood bolster base can slide easily thereon.

The rear or second bolster 43 is substantially the same as the first or forward bolster 23. It has a base portion 44 which slides and pivots on the metal plate 45. It also has padded channelled portions 47 and load-tying brackets 46. Its pivot bolt or pin 48, however, rotates and is capable of sliding easily in the longitudinal slot 17 which extends through the platform 41.

It is imperative when hauling this type of load that the bolsters 23 and 43 be parallel with and in line with each other at all times. Therefore the right end of the first bolster is linked to the left end of the rear or second bolster, and similarly the left end of the first bolster is linked to the right end of the second bolster. In the drawings the link means is shown as crossed ropes 34 and 35 connected to the brackets 26 and 46. In practice, however, suitable chains or wire cables may be used instead of ropes.

Figure 4:
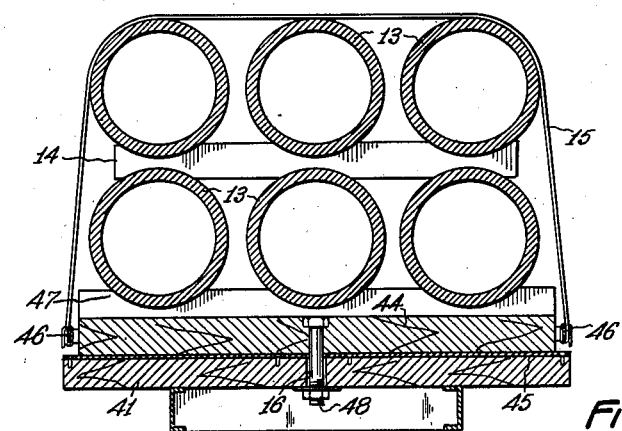
Figure 4 is a cross-sectional view of the truck platform and load taken through the lines 4—4 of the Figure 1.
Figure 5:
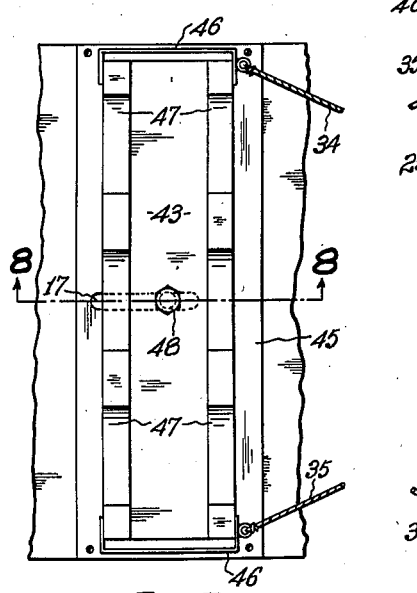
Figure 5 is a plan view of a portion of the rear truck platform and its sliding and pivoted bolster member thereon.
Figure 6:
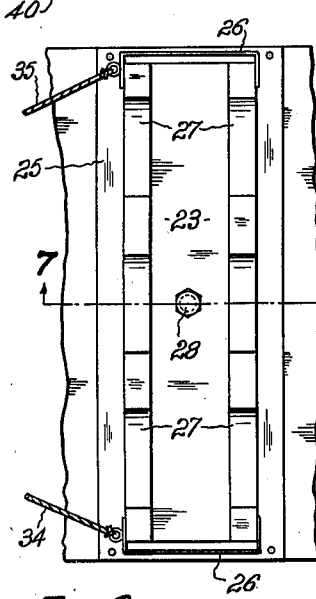
Figure 6 is a plan view of a portion of the front truck with its pivoted bolster member thereon.
Figure 7:
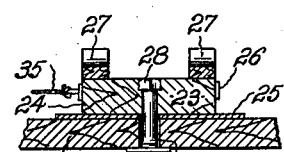
Figure 7 is a vertical cross-sectional view of a portion of the front truck and the pivoted bolster taken along the lines and in the direction of the arrows 7—7 of the Figure 6.
Figure 8:
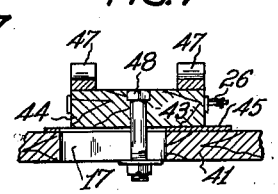
Figure 8 is a vertical cross-sectional view of a portion of the rear truck platform and its bolster member taken along the lines 8—8 of the Figure 5.

The Figure 4 shows in cross-section how a load of this type of material is carried. In this figure the lower three pipes 13 are resting in the channels 27 of the bolster. A second layer of three pipes is carried by the saddle 14 also in a spaced relation. The weight of the load is therefore evenly distributed and the shape of the pipes is not distorted or otherwise damaged. A flat strap 15, the ends of which are fastened to the bolster brackets 26 and 46, securely holds the pipes in a rigid position with all the stress and strain thereon evenly distributed. At this point it may be well to mention that ordinary rope or cable is not suitable for tying the pipes 13 to the bolsters because they are apt to cut into the cover and coatings on the pipes and damage them.

Because of the fact that the carriages 19 and 39 are pivoted or steerable and further because of the use of the universal link member 32, the truck or train herein described is capable of making a relatively sharp turn. A turn at least sharp enough to permit its use on and around ordinary city streets is capable of being negotiated. As the trailers 20 and 40 become out of line by reason of a turn, the train shortens slightly and the rear bolster 43 moves backward on the platform 41 and its pin 48 slides rearward as it pivots in the slot 17. Therefore there is no strain or drag on the load proper. The support member, which consists of the bolsters 23 and 43 and the crossed link members 34 and 35 attached thereto, carries the pipes 13 only and is not used in any way to draw or guide the trailers with respect to each other.

One of the many advantages had by the use of this device is the smoothness at which a relatively frangible load may be carried over hilly or rough roads. Naturally the trailers and particularly their carriages get out of horizontal alignment when the truck travels over rolling, bumpy or hilly roads. As this happens, a certain amount of lateral rocking motion takes place at the channels 27 and 47. By mounting the two bolsters on their respective platforms at points midway between the carriages, the injurious effect of the rocking motion is alleviated. In other words, at no time do either of the bolsters go above or below normal horizontal alignment more than one-half the distance any one of the carriages may go out of similar alignment. By mounting as shown, a certain levelling or stabilizing effect is obtained. Minor rocking motions caused by rough roads, which cannot be avoided in assemblies such as this are minimized by the two fifth wheels and are absorbed by the padding between the channel portions and the pipe surfaces so that regardless of highway conditions the load itself is not materially affected thereby.

It will now be clear that there is provided by this invention an articulated vehicle which accomplishes the objects herein set forth. While the invention has been illustrated in its preferred form and while it has been described in certain specific terms and language, it is to be understood that the embodiment of the invention as illustrated and described is suggestive only and is not to be considered in a limiting sense. It should be further understood that there may be other forms or adaptations of the invention and those modifications are also considered to be within the broad scope of this invention as no limitations upon it are intended other than those imposed thereon by the breadth of the appended claim.

I claim:

An articulated vehicle of the type used for hauling long, heavy and frangible articles, comprising in combination, a tractor member including first and second carriage portions and having a fifth-wheel mounted over the said second carriage portion; a first trailer member including a third carriage portion and having a platform pivotally engageable with the tractor member fifth-wheel, the said first trailer member also having a front bolster portion pivotally mounted on the said platform intermediate the said second and third carriages; a dolly member including a fourth carriage portion flexibly linked to the said first trailer member and having a fifth-wheel mounted over the said fourth carriage portion; a second trailer member including a fifth carriage portion and having a platform pivotally engageable with the dolly member fifth-wheel, the said second trailer member having a rear bolster portion slidably and pivotally mounted on the said platform intermediate the said fourth and fifth carriage portions; and a crossed link means mounted on and connecting the said front and rear bolster portions together in parallel relation; all of the said members and means being assembled in a manner whereby only approximately one-half of the vertical and lateral movement of the said carriage portions is imparted to the said articles being hauled.

ROY S. STARKEY.